United States Patent
Luthi et al.

(10) Patent No.: US 11,447,080 B2
(45) Date of Patent: Sep. 20, 2022

(54) WIRE HARNESS RETAINER ASSEMBLY AND METHODS FOR USE

(71) Applicant: The Boeing Company, Chicago, IL (US)

(72) Inventors: Benjamin Luthi, Chicago, IL (US); David O. Fisher, Chicago, IL (US); Steven P. West, Chicago, IL (US); Robert F. Lyons, Chicago, IL (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 16/843,817

(22) Filed: Apr. 8, 2020

(65) Prior Publication Data

US 2021/0155175 A1 May 27, 2021

Related U.S. Application Data

(60) Provisional application No. 62/939,170, filed on Nov. 22, 2019.

(51) Int. Cl.
*B60R 16/02* (2006.01)
*F16B 21/18* (2006.01)
*F16B 21/10* (2006.01)

(52) U.S. Cl.
CPC ......... *B60R 16/0215* (2013.01); *F16B 21/10* (2013.01); *F16B 21/18* (2013.01)

(58) Field of Classification Search
CPC . B60R 16/0215; B60R 16/0207; B60R 16/02; B60R 16/0222; F16B 21/10; F16B 21/186; F16B 5/10; Y10T 24/45518; Y10T 24/45634; Y10T 403/75

USPC ..................... 248/65, 72, 71, 74.4
See application file for complete search history.

(56) References Cited

U.S. PATENT DOCUMENTS

| | | | | |
|---|---|---|---|---|
| 1,837,930 A * | 12/1931 | Waite | ........................ | F16L 3/00 248/58 |
| 3,037,542 A * | 6/1962 | Boyd | ........................ | F16B 5/10 411/964 |
| 3,125,922 A * | 3/1964 | Sauter | ................... | F16B 21/186 403/408.1 |
| 3,858,164 A * | 12/1974 | Leonard | ................. | H01R 12/58 439/329 |
| 6,350,956 B1 * | 2/2002 | Sakata | ............... | B60R 16/0215 16/221 |
| 6,419,192 B1 * | 7/2002 | Riecke | ................. | F16B 41/002 248/65 |
| 7,686,259 B2 * | 3/2010 | Caveney | ............ | B60R 16/0215 248/68.1 |
| 9,004,415 B2 * | 4/2015 | Fukumoto | ................ | F16B 2/14 248/71 |
| 9,470,252 B2 * | 10/2016 | Karls | ........................ | F16B 2/04 |

(Continued)

*Primary Examiner* — Nkeisha Smith
(74) *Attorney, Agent, or Firm* — McDonnell Boehnen Hulbert & Berghoff LLP (57) ABSTRACT

The present disclosure provides a wire harness retainer assembly. The wire harness retainer assembly includes a stud including a first end and a second end opposite the first end. The stud includes a cavity between the first end and the second end. The stud is configured to receive a wire harness retainer thereon. The wire harness retainer assembly also includes a plug configured to be positioned at least partially within the cavity to lock the wire harness retainer onto the stud.

20 Claims, 7 Drawing Sheets

(56) References Cited

U.S. PATENT DOCUMENTS

| | | | |
|---|---|---|---|
| 2003/0056974 A1* | 3/2003 | Nakata | H02G 3/22 174/151 |
| 2004/0206855 A1* | 10/2004 | Caveney | B60R 16/0215 248/68.1 |
| 2013/0162028 A1* | 6/2013 | Bierley | B60R 11/04 307/10.1 |
| 2015/0300533 A1* | 10/2015 | Karls | B60R 16/0215 248/73 |
| 2016/0189828 A1* | 6/2016 | Oga | H01B 7/282 174/72 A |
| 2020/0111586 A1* | 4/2020 | Kim | H01B 3/308 |
| 2021/0013684 A1* | 1/2021 | Buck | H01R 13/74 |

\* cited by examiner

WIRE HARNESS RETAINER ASSEMBLY AND METHODS FOR USE

CROSS-REFERENCE TO RELATED APPLICATIONS

This application claims priority U.S. Provisional Application No. 62/939,170 entitled "Push On Stud," filed on Nov. 22, 2019, which is hereby incorporated by reference in its entirety.

FIELD

The present disclosure relates generally to a wire harness retainer assembly for use in aircraft manufacturing, and more particularly, to a stud and plug that together enable a wire harness retainer to be attached to a structural component of the aircraft without the need for a hidden bolt.

BACKGROUND

Wire harnesses are used in aircraft manufacturing to organize and direct the large number of wires required for aircraft functionality. Current wire harnesses use a bolt to hold a wire harness retainer to a stand-off positioned in an aircraft structure. However, once the wire harness retainer is installed, it is difficult to access the bolt which is now positioned between the wire harness retainer and the aircraft structure. Thus, it would be desirable to utilize a wire harness retainer assembly that did not include a bolt between the wire harness retainer and the aircraft structure.

SUMMARY

In one aspect, a wire harness retainer assembly is described. The wire harness retainer assembly includes (a) a stud including a first end and a second end opposite the first end, wherein the stud includes a cavity between the first end and the second end, and wherein the stud is configured to receive a wire harness retainer thereon, and (b) a plug configured to be positioned at least partially within the cavity to lock the wire harness retainer onto the stud.

In another aspect, a method of installing a wire harness retainer assembly is described. The method includes (a) positioning a first end of a stud into a hole in a structure, wherein the stud includes a second end opposite the first end, and wherein the stud includes a cavity between the first end and the second end, (b) positioning a wire harness retainer circumferentially around at least the second end of the stud, and (c) positioning a plug within the cavity of the stud.

In yet another aspect, an aircraft is described. The aircraft includes (a) a structure, and (b) a wire harness retainer assembly configured to be coupled to the structure, the wire harness retainer assembly comprising: (i) a stud including a first end and a second end opposite the first end, wherein the first end of the stud is configured to be positioned within a hole formed in the structure, wherein the stud includes a cavity between the first end and the second end, and wherein the stud is configured to receive a wire harness retainer thereon, and (ii) a plug configured to be positioned at least partially within the cavity of the stud to lock the wire harness retainer onto the stud.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 5:
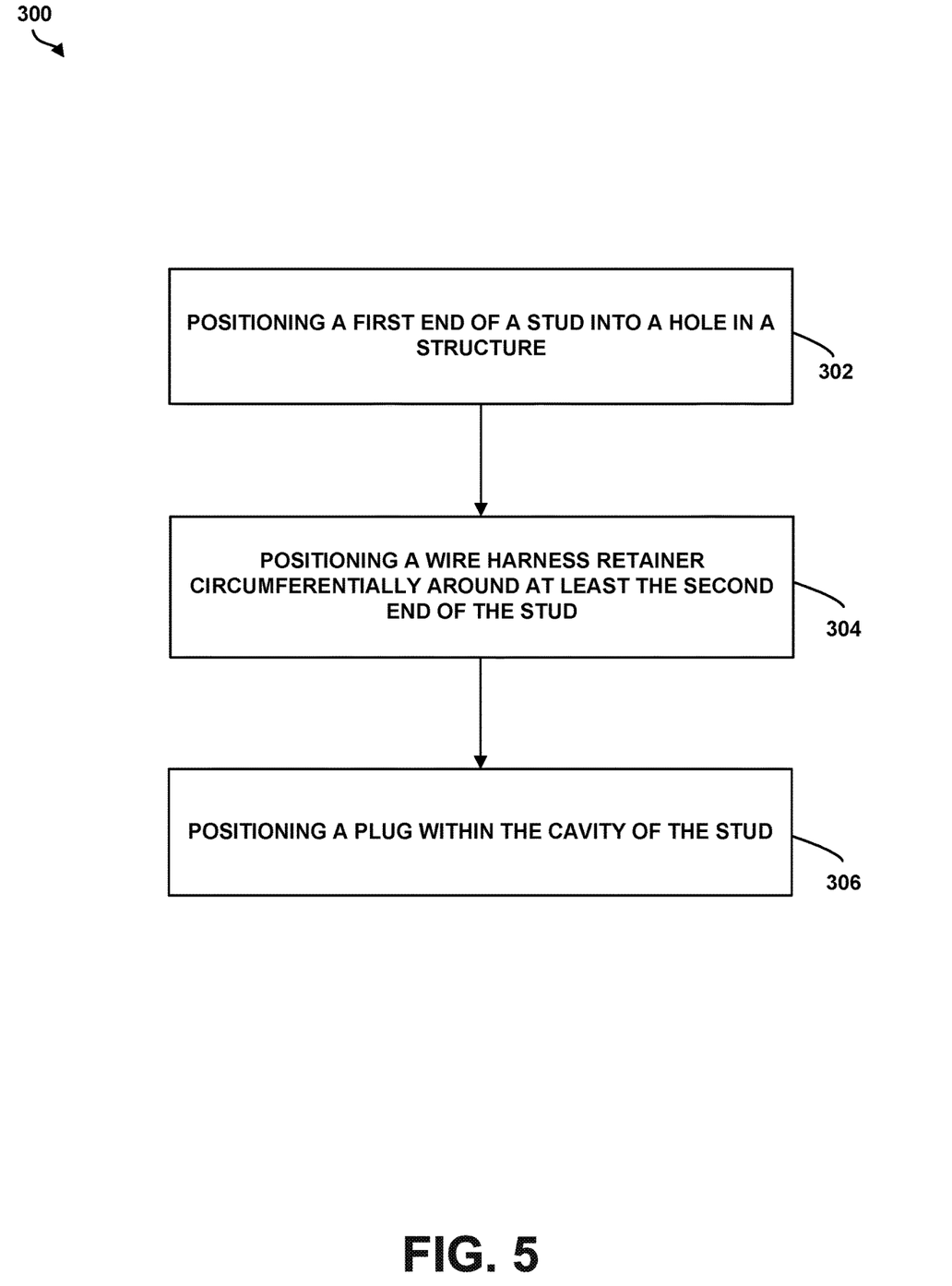
FIG. 5 is a flowchart of an example method, according to an example embodiment.

In FIG. 5, the blocks represent operations and/or portions thereof and lines connecting the various blocks do not imply any particular order or dependency of the operations or portions thereof. It will be understood that not all dependencies among the various disclosed operations are necessarily represented. FIG. 5 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously.

Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means+/−5%.

Illustrative, non-exhaustive examples, which may or may not be claimed, of the subject matter according the present disclosure are provided below.

Figure 1A:
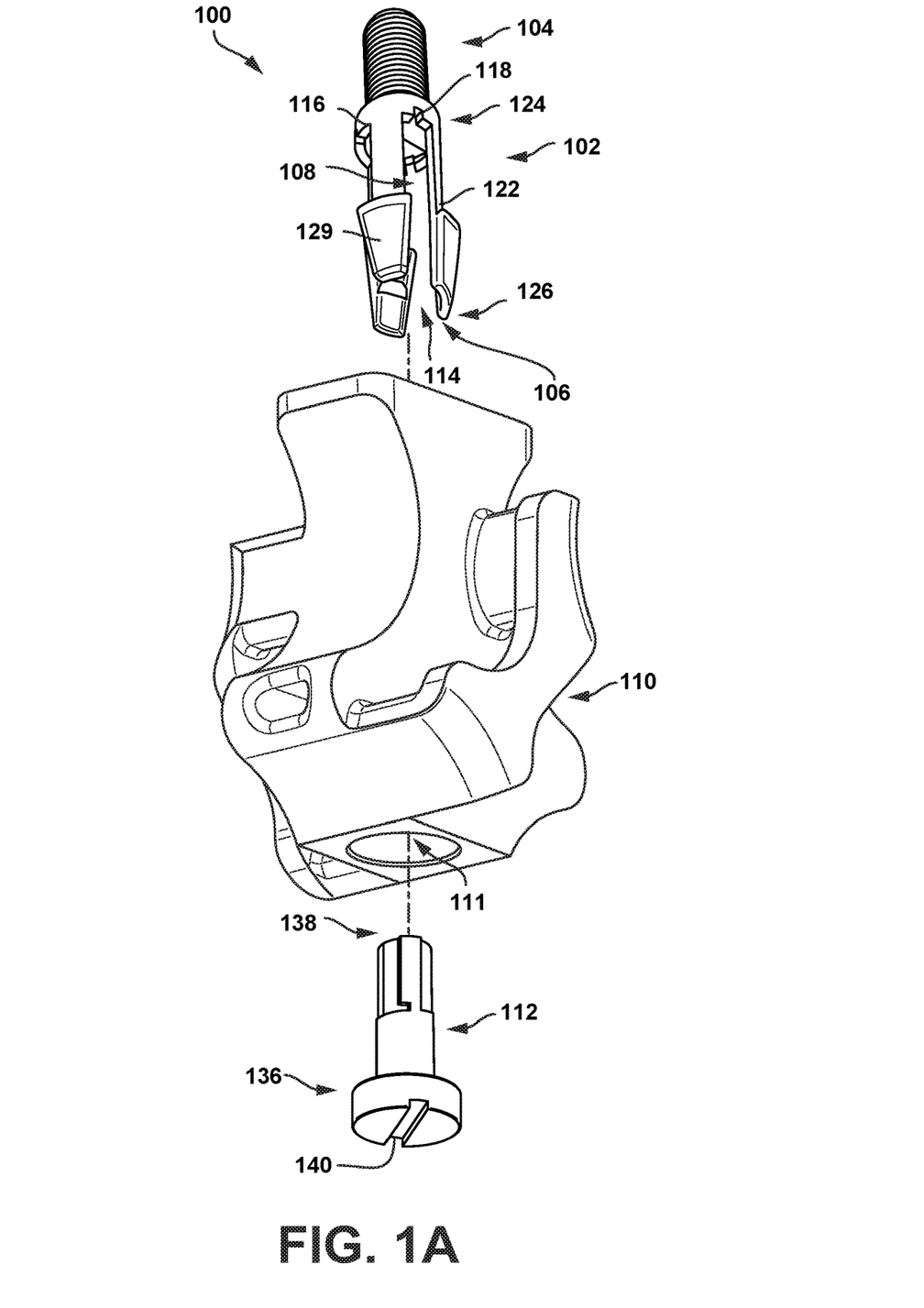
FIG. 1A is an exploded view of a wire harness retainer assembly, according to an example embodiment.
Figure 1B:
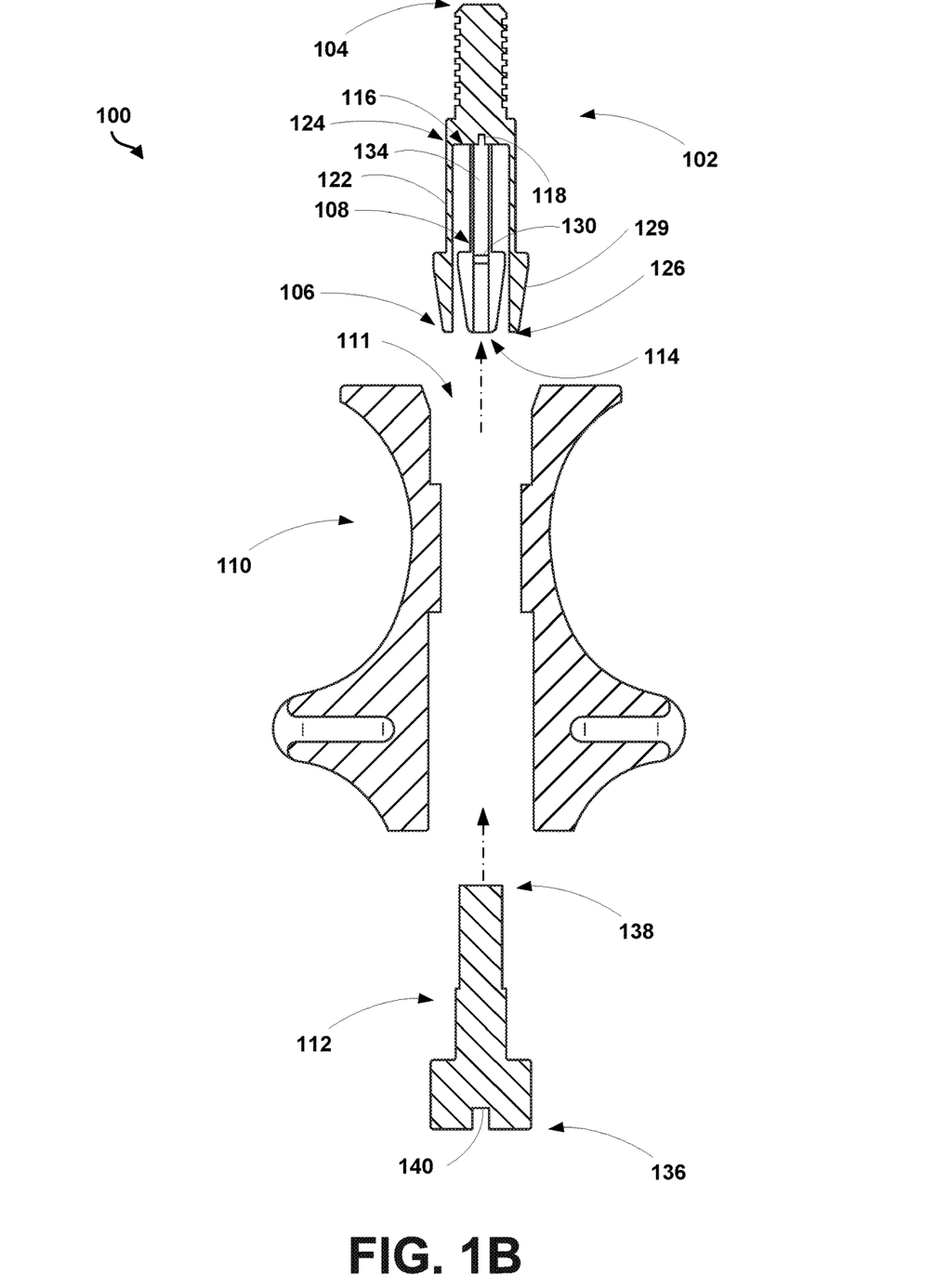
FIG. 1B is an exploded side cross-sectional view of the wire harness retainer assembly of FIG. 1A, according to an example embodiment.

With reference to the Figures, FIG. 1A is an exploded view of a wire harness retainer assembly 100, and FIG. 1B illustrates an exploded side cross-sectional view of the wire harness retainer assembly of FIG. 1A. As shown in FIGS. 1A-1B, the wire harness retainer assembly 100 includes a stud 102 including a first end 104 and a second end 106 opposite the first end 104. The stud includes a cavity 108 between the first end 104 and the second end 106. In use, the stud 102 is configured to receive a wire harness retainer 110 thereon. The wire harness retainer 110 may take a variety of forms other than the specific configuration shown in FIGS. 1A-1B. For example, the wire harness retainer 110 may comprise a clamp, a ringpost, a singlepost, or a P clamp, as non-limiting examples. The wire harness retainer 110 may include a through hole 111 into which the stud 102 is positioned when in use. The wire harness retainer assembly 100 further includes a plug 112 configured to be positioned at least partially within the cavity 108 to lock the wire harness retainer 110 onto the stud 102.

As shown in FIGS. 1A-1B, the cavity 108 may include an opening 114 at the second end 106 of the stud 102, and a base 116 between the first end 104 of the stud 102 and the second end 106 of the stud 102. The base 116 may include a first drive socket 118 recessed in the base 116. The first drive socket 118 may comprise a hex head socket, a cross-head recess, or a slotted recess, as non-limiting examples.

The first drive socket 118 may be used in combination with a driver to rotate the stud 102 into a structure during use, as discussed in additional detail below. In such an example, the first end 104 of the stud 102 may be threaded to engage with a corresponding threaded surface in the structure. The first end 104 of the stud 102 may be cylindrical in shape so that the stud 102 is non-directional. Such an arrangement may be advantageous to enable the wiring attached to the stud 102 once the wire harness retainer assembly 100 is fully assembled to thereby control the direction of the stud 102.

In one example, the first end 104 of the stud 102 comprises a first material, and the second end 106 of the stud 102 comprises a second material that is different than the first material. In one particular example, the first material comprises a metal (such as titanium as a non-limiting example), and the second material comprises a plastic (such as nylon or polyether ether ketone (PEEK) as non-limiting examples). As such, the first end 104 of the stud 102 may be rigid to provide increased strength when a to the structure, while the second end 106 of the stud 102 may be flexible to enable the wire harness retainer 110 and plug 112 to be positioned thereon.

As shown in FIGS. 1A-1B, the second end 106 of the stud 102 includes a plurality of biasing arms 122. In such an example, the cavity 108 is defined by an area between the plurality of biasing arms 122. Although the Figures illustrate three biasing arms 122, the stud 102 may include two biasing arms 122 or four biasing arms 122. Other numbers of biasing arms 122 are possible as well. When assembled, the plug 112 interacts with the plurality of biasing arms 122 of the stud 102 to prevent axial movement of the plug 112 with respect to the stud 102 and further prevent axial movement of the wire harness retainer 110 with respect to the stud 102 when the plug 112 is positioned at least partially in the cavity 108 of the stud 102.

Figure 2A:
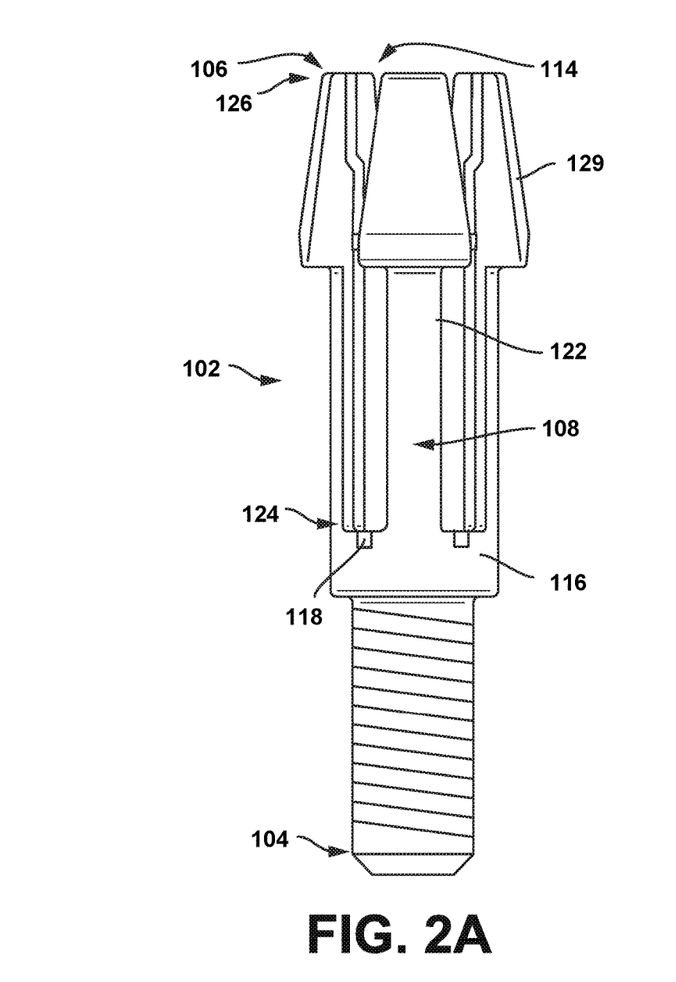
FIG. 2A is a side view of the stud of FIG. 1A, according to an example embodiment.

FIG. 2A illustrates a side view of the stud 102 of FIG. 1A. As shown in FIG. 2A, the plurality of biasing arms 122 may each comprise a first end 124 coupled to the base 116 formed on the stud 102, and a second end 126 opposite the first end 124. In such an example, a second end 126 of each of the plurality of biasing arms 122 may include an angled tab 129 with a thickness greater than a thickness of the first end 124 of each of the plurality of biasing arms 122. The angled tab 129 on each of the plurality of biasing arms 122 may taper in a direction towards the second end 126 of the biasing arm 122. The angled tab 129 on each of the plurality of biasing arms 122 may help the biasing arms 122 to move inward as the wire harness retainer 110 is positioned over the stud 102. Subsequently, once the wire harness retainer 110 is disposed on the stud 102, the plurality of biasing arms 122 return to their unbiased state. As such, the plurality of biasing arms 122 provide the initial retention of the wire harness retainer 110.

Figure 2B:
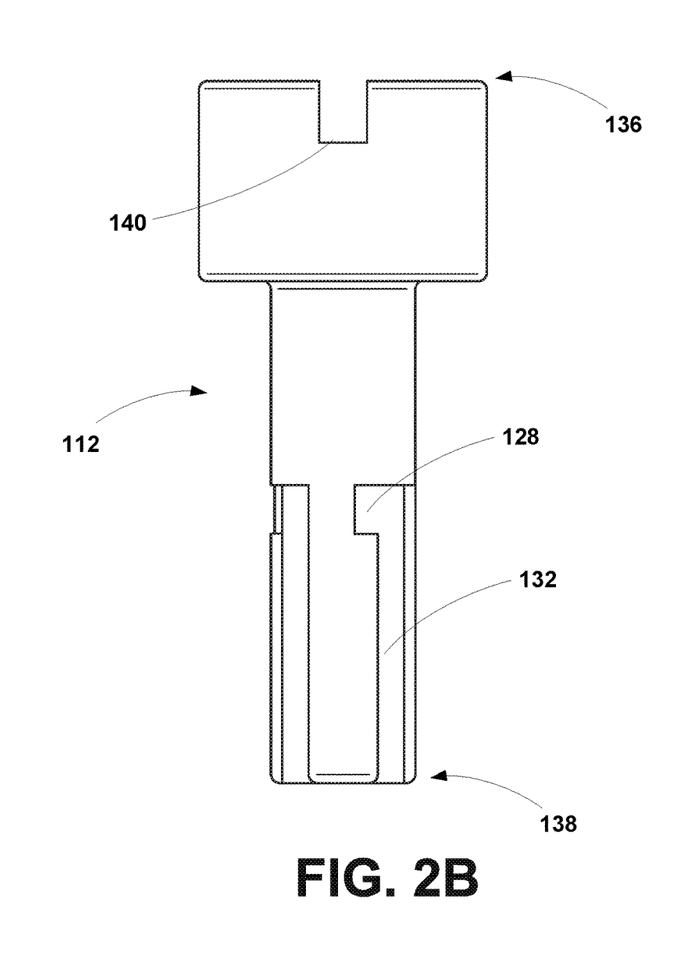
FIG. 2B is a side view of the plug of FIG. 1A, according to an example embodiment.
Figure 6:
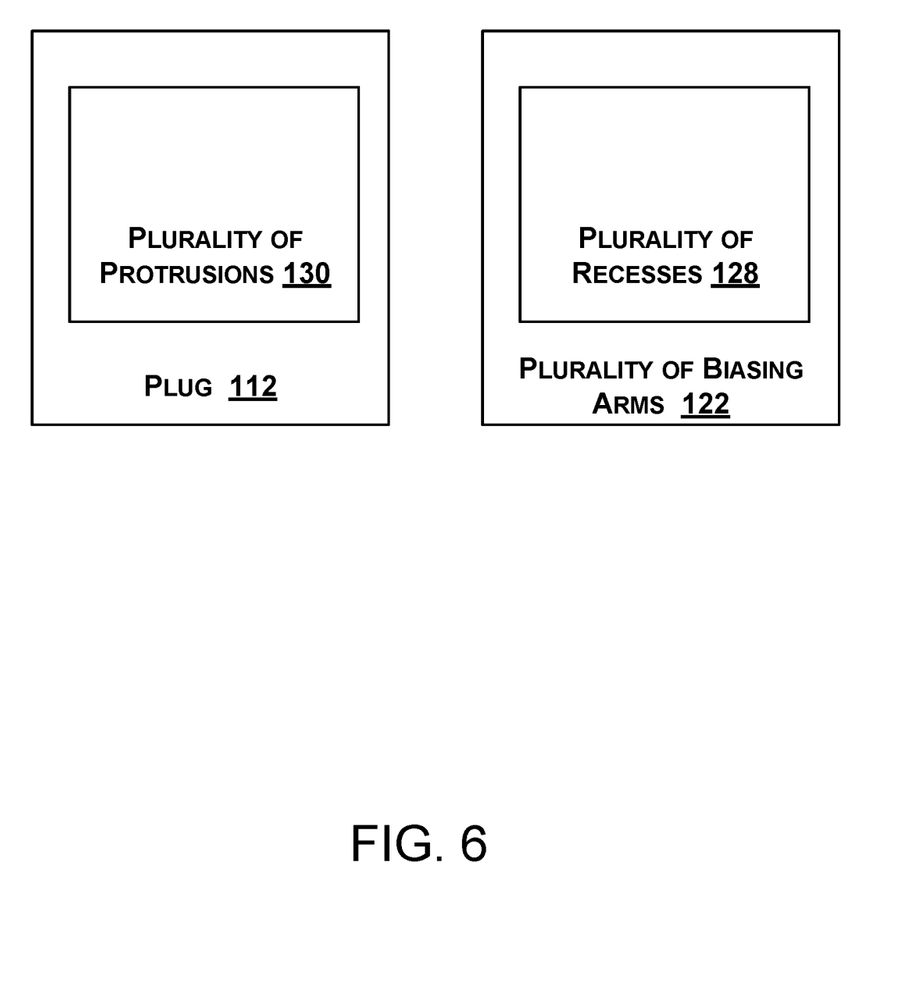
FIG. 6 is a block diagram of a plug and of a plurality of biasing arms, according to an example.

FIG. 2B illustrates a side view of the plug 112 of FIG. 1A. As shown in FIG. 2B, the plug 112 may include a plurality of recesses 128. As further shown in FIG. 1B, the plurality of biasing arms 122 may each include a protrusion 130 configured to interact with the plurality of recesses 128 to thereby prevent axial movement of the plug 112 with respect to the stud 102 when the plug 112 is positioned at least partially in the cavity 108 of the stud 102. Additionally or alternatively, as shown in FIG. 2B, the plug 112 may include a plurality of longitudinal channels 132. As further shown in FIG. 1B, the plurality of biasing arms 122 each include a spine 134 configured to interact with the plurality of longitudinal channels 132 to thereby prevent axial movement of the plug 112 with respect to the stud 102 when the plug 112 is positioned at least partially in the cavity 108 of the stud 102. In another example shown in FIG. 6, the plug 112 includes the plurality of protrusions 130, and the plurality of biasing arms 122 each include the recess 128 configured to interact with the plurality of protrusions 130 to thereby prevent axial movement of the plug 112 with respect to the stud 102 when the plug 112 is positioned at least partially in the cavity 108 of the stud 102. Other mechanisms for preventing axial movement of the plug 112 with respect to the stud 102 are possible as well.

As shown in FIG. 2B, the plug 112 has a first end 136 and a second end 138 opposite the first end 136. In one example, the first end 136 of the plug 112 has a first diameter and the second end 138 of the plug 112 has a second diameter that is less than the first diameter. In one example, the second end 138 of the plug 112 is configured to be positioned within the cavity 108 of the stud 102, and the first end 136 of the plug 112 is configured to remain outside of the cavity 108 of the stud 102. In another example, both the first end 136 of the plug 112 and the second end 138 of the plug 112 are configured to be positioned within the cavity 108 of the stud 102. Such an arrangement may provide a visual indication for a user that the plug 112 is properly installed in the stud 102. For example, is a user can see the first end 136 of the plug 112 extending out of the cavity 108, the user may know that the wire harness retainer 110 is not secured in the stud 102. In such an example, the first end 136 of the plug 112 may be a different color than the other components of the wire harness retainer assembly 100 to make it easy to determine whether or not the first end 136 of the plug 112 is extending out of the cavity 108.

As shown in FIG. 2B, the first end 136 of the plug 112 may include a second drive socket 140 recessed in the first end 136 of the plug 112. The second drive socket 140 may comprise a hex head socket, a crosshead recess, or a slotted recess, as non-limiting examples. In use, the stud 102 is positioned in a structure, the wire harness retainer 110 is positioned over the stud 102 by positioning the stud 102 into the through hole of the wire harness retainer 110, and then the plug is then positioned into the cavity 108 of the stud and further into the through hole 111 of the wire harness retainer 110. Once installed, the stud 102, the wire harness retainer 110, and the plug 112 are configured to be permanently coupled to one another when the plug 112 is positioned at least partially within the cavity 108 of the stud 102. However, the entire wire harness retainer assembly 100 can be removed via the second drive socket 140 recessed in the first end 136 of the plug 112 by rotating the entire wire harness retainer assembly 100 in a counterclockwise direction.

Figure 3A:
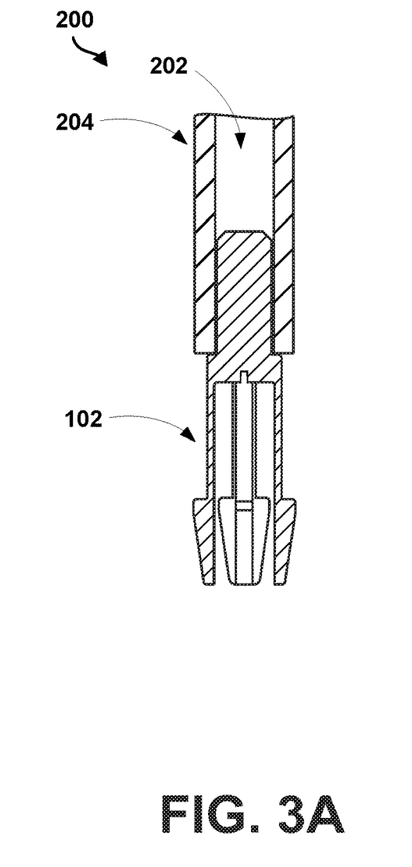
FIG. 3A illustrates a side cross-sectional view of an initial assembly step of the wire harness retainer assembly of FIG. 1A, according to an example embodiment.
Figure 3B:
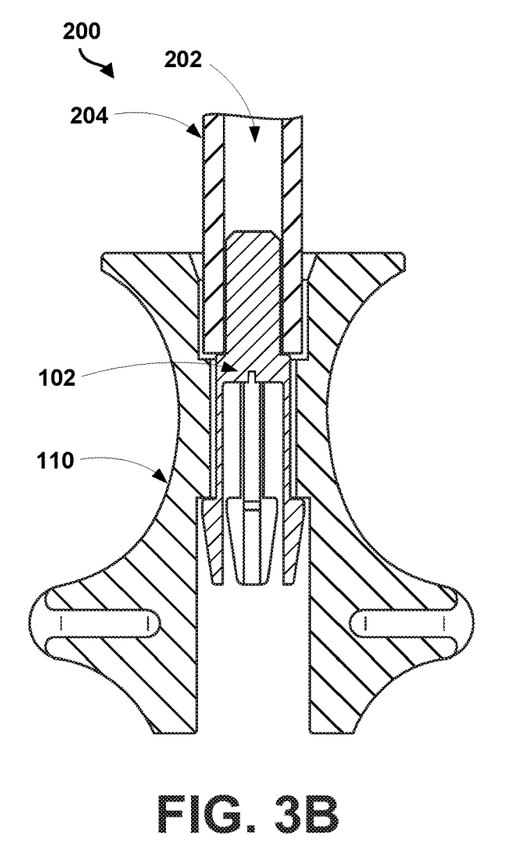
FIG. 3B illustrates a side cross-sectional view of an intermediate assembly step of the wire harness retainer assembly of FIG. 1A, according to an example embodiment.
Figure 3C:
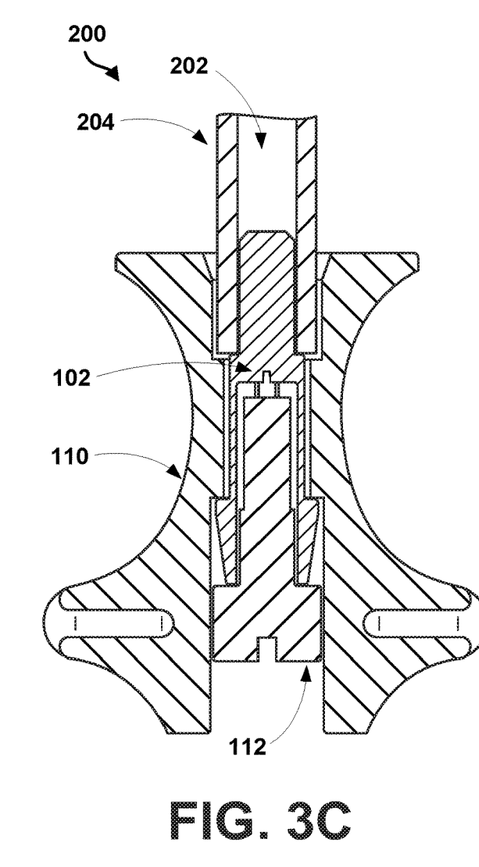
FIG. 3C illustrates a side cross-sectional view of a final assembly step of the wire harness retainer assembly of FIG. 1A, according to an example embodiment.

FIGS. 3A-3C illustrate the wire harness retainer assembly 100 in various stages of installation. In particular, FIG. 3A illustrates an initial assembly step of the wire harness retainer assembly 100. As shown in FIG. 3A, the first end 104 of the stud 102 of the wire harness retainer assembly 100 is positioned into a hole 202 in a structure 204 of an aircraft 200. The structure 204 may comprise an airframe of the aircraft 200, as a non-limiting example. As discussed above, the stud 102 includes a second end 106 opposite the first end 104, and the stud 102 includes a cavity 108 between the first end 104 and the second end 106. In one example, the first end 104 of the stud 102 is threaded, and positioning the first end 104 of the stud 102 into the hole 202 in the structure 204 comprises rotating the stud 102 with respect to the structure 204 to thereby cause the threads of the first end 104 of the stud 102 to interact with corresponding threads in the hole 202 in the structure 204. As discussed above, the base 116 of the stud 102 may include a first drive socket 118 recessed in the base 116 that may be used in combination with a driver to rotate the stud 102 into the hole 202 of the structure 204.

FIG. 3B illustrates the wire harness retainer 110 positioned circumferentially around the second end 106 of the stud 102. In one example, the wire harness retainer 110 includes through hole 111 into which the second end 106 of the stud 102 is positioned. As the wire harness retainer 110 is positioned circumferentially around the second end 106 of the stud 102, the wire harness retainer 110 is pushed against the plurality of biasing arms 122 of the stud 102, causing the plurality of biasing arms 122 to bend inwardly enabling the wire harness retainer 110 to slide onto the stud 102. Subsequently, once the wire harness retainer 110 is disposed on the stud 102, the plurality of biasing arms 122 return to their unbiased state. As such, the plurality of biasing arms 122 provide the initial retention of the wire harness retainer 110 on the stud 102. In particular, the wire harness retainer 110 interacts with the second end 106 of the stud 102 to prevent axial movement of the wire harness retainer 110 with respect to the stud 102 when the wire harness retainer 110 is positioned circumferentially around the second end 106 of the stud 102.

As discussed above, the second end 126 of each of the plurality of biasing arms 122 may include an angled tab 129 with a thickness greater than a thickness of the first end 124 of each of the plurality of biasing arms 122. The angled tab 129 on each of the plurality of biasing arms 122 may taper in a direction towards the second end 126 of the biasing arm 122. The angled tab 129 on each of the plurality of biasing arms 122 may help the biasing arms 122 to move inward as the wire harness retainer 110 is positioned over the stud 102.

FIG. 3C illustrates the plug 112 positioned within the cavity 108 of the stud 102. FIG. 3C illustrates the final assembly step of the wire harness retainer assembly 100. As shown in FIG. 3C, the plug 112 interacts with the second end 106 of the stud 102 to prevent axial movement of the plug 112 with respect to the stud 102 when the plug 112 is positioned in the cavity 108 of the stud 102. In particular, as discussed above, in one example the plug 112 may include a plurality of recesses 128, and the plurality of biasing arms 122 of the stud 102 may each include a protrusion 130 configured to interact with the plurality of recesses 128 to thereby prevent axial movement of the plug 112 with respect to the stud 102 when the plug 112 is positioned at least partially in the cavity 108 of the stud 102. Additionally or alternatively, the plug 112 may include a plurality of longitudinal channels 132, and the plurality of biasing arms 122 each include a spine 134 configured to interact with the plurality of longitudinal channels 132 to thereby prevent axial movement of the plug 112 with respect to the stud 102 when the plug 112 is positioned at least partially in the cavity 108 of the stud 102. In another example, the plug 112 includes the plurality of protrusions 130, and the plurality of biasing arms 122 each include the recess 128 configured to interact with the plurality of protrusions 130 to thereby prevent axial movement of the plug 112 with respect to the stud 102 when the plug 112 is positioned at least partially in the cavity 108 of the stud 102. Other mechanisms for preventing axial movement of the plug 112 with respect to the stud 102 are possible as well.

When the plug 112 is properly positioned within the cavity 108 of the stud 102, the plug 112 may provide an audible sound and/or tactile feedback to the user. As such, the user can use the audible and/or tactile feedback from the plug 112 to know that the wire harness retainer 110 is properly secured to the stud 102. Further, as discussed above, the first end 136 of the plug 112 may be a different color than the other components of the wire harness retainer assembly 100 to make it easy to determine whether or not the first end 136 of the plug 112 is extending out of the cavity 108. If the first end 136 of the plug 112 is extending out of the cavity 108, the user can then determine that the plug 112 is not properly positioned in the stud 102 and therefore determine that the wire harness retainer 110 is not properly secured to the stud 102.

Figure 4:
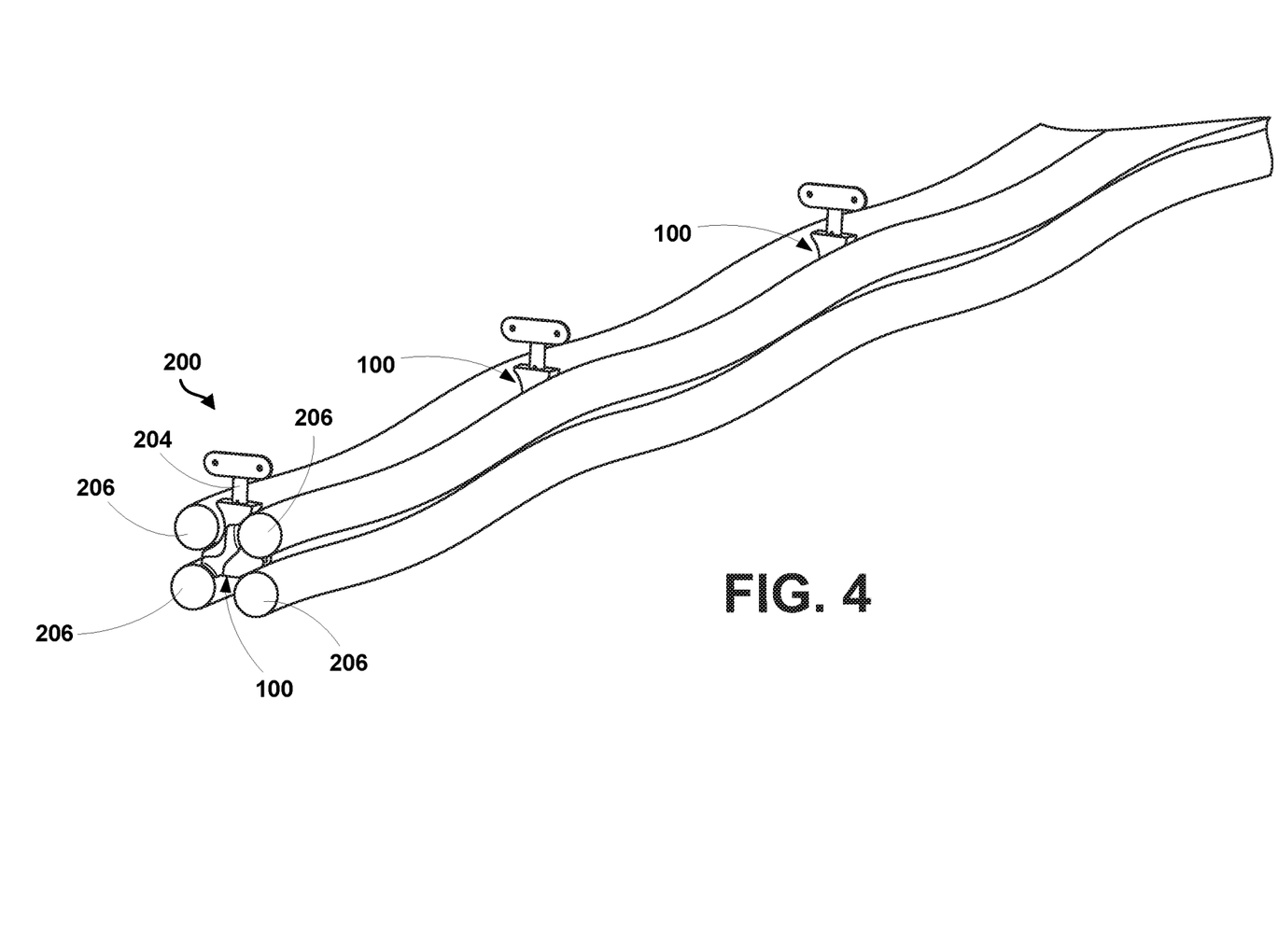
FIG. 4 illustrates the wire harness retainer assembly of FIG. 1A in use, according to an example embodiment.

FIG. 4 illustrates the wire harness retainer assembly 100 in use, according to an example embodiment. In particular, FIG. 4 illustrates the wire harness retainer assembly 100 coupled to a structure 204 of an aircraft 200. The structure 204 in this case comprises a standoff including a tab, which may in turn be secured to an airframe of the aircraft 200. As shown in FIG. 4, the wire harness retainer 110 of the wire harness retainer assembly 100 is used to organize and direct a plurality of wires 206 that required for aircraft functionality. As further shown in FIG. 4, a plurality of wire harness retainer assemblies 100 may be used along the length of the plurality of wires 206.

As such, the present disclosure provides a single use wire harness retainer assembly 100 that enables the wire harness retainer 110 to be coupled to a structure 204 of an aircraft 200 without the use of a blind fastener located between the wire harness retainer 110 and the structure 204. Further, the wire harness retainer assembly 100 described above eliminates the requirement to fasten the wire harness retainer 110 with a threaded fastener after attaching the wire. In previous designs, it was not possible to fully load up the wire harness retainer 110 with wire because the wire will block the hole that the wire harness retainer 110 uses to connect to the structure 204.

The design of the present disclosure will enable the attaching of the wire to the wire harness retainer 110 in a more ergonomically beneficial location, instead of requiring workers to work over their heads. A further advantage of the present design is that the stud 102 can be screwed into the same stand offs that the current solutions use, and then the wire harness retainer 110 and plug 112 are simply pushed on to the stud 102 without using tools. Such a design may facilitate a transition to a more automated installation plan in the future. Additionally, the wire harness retainer assembly 100 described above mays reduce the amount of time it takes to install the complicated wiring required for aircraft functionality.

FIG. 5 is a block diagram of an example of a method 300 of installing a wire harness retainer assembly. Method 300 shown in FIG. 5 presents an embodiment of a method that could be used with any of the embodiments of the wire harness retainer assembly 100 discussed above in relation to FIGS. 1A-4, as an example. Method 300 includes one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes positioning a first end 104 of a stud 102 into a hole 202 in a structure 204. Method step 302 is illustrated in FIG. 3A, as discussed above. At block 304, the method 300 includes positioning a wire harness retainer 110 circumferentially around at least the second end 106 of the stud 102. Method step 304 is illustrated in FIG. 3B, as discussed above. At block 306, the method 300 includes positioning a plug 112 within the cavity 108 of the stud 102. Method step 306 is illustrated in FIG. 3C, as discussed above.

Once installed, the stud 102, the wire harness retainer 110, and the plug 112 are configured to be permanently coupled to one another when the plug 112 is positioned at least partially within the cavity 108 of the stud 102. However, the entire wire harness retainer assembly 100 can be removed via a second drive socket 140 recessed in the first end 136 of the plug 112. In such an example, the method 300 further includes rotating the plug 112 in a counterclockwise direction to remove each of the plug 112, the wire harness retainer 110, and the stud 102 from the structure 204.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A wire harness retainer assembly comprising:
a stud including a first end and a second end opposite the first end, wherein the stud includes a cavity between the first end and the second end, the stud comprising a plurality of biasing arms that define an opening at the second end of the stud, wherein the stud is configured to receive a wire harness retainer thereon, wherein the cavity includes a base between the first end of the stud and the second end of the stud, and wherein the base includes a first drive socket recessed in the base; and
a plug configured to be inserted through the opening toward the first end into the cavity to lock the wire harness retainer onto the stud.

2. The wire harness retainer assembly of claim 1, wherein the cavity is defined by an area between the plurality of biasing arms.

3. The wire harness retainer assembly of claim 1, wherein the plurality of biasing arms each comprise a first end coupled to the base, and wherein a second end of each of the plurality of biasing arms has an angled tab with a thickness greater than a thickness of the first end of each of the plurality of biasing arms.

4. The wire harness retainer assembly of claim 1, wherein the plug includes a plurality of recesses, and wherein the plurality of biasing arms each include a protrusion configured to interact with the plurality of recesses to thereby prevent axial movement of the plug with respect to the stud when the plug is positioned at least partially in the cavity of the stud.

5. The wire harness retainer assembly of claim 1, wherein the plug includes a plurality of longitudinal channels, and wherein the plurality of biasing arms each include a spine configured to interact with the plurality of longitudinal channels to thereby prevent axial movement of the plug with respect to the stud when the plug is positioned at least partially in the cavity of the stud.

6. The wire harness retainer assembly of claim 1, wherein the plug interacts with the plurality of biasing arms of the stud to prevent axial movement of the plug with respect to the stud and further prevent axial movement of the wire harness retainer with respect to the stud when the plug is positioned at least partially in the cavity of the stud.

7. The wire harness retainer assembly of claim 1, wherein the plug has a first end and a second end opposite the first end, and wherein the first end of the plug has a first diameter and the second end of the plug has a second diameter that is less than the first diameter.

8. The wire harness retainer assembly of claim 1, wherein the plug has a first end and a second end opposite the first end, wherein the second end of the plug is configured to be positioned within the cavity of the stud, and wherein the first end of the plug is configured to remain outside of the cavity of the stud.

9. The wire harness retainer assembly of claim 1, wherein the plug has a first end and a second end opposite the first end, and wherein the first end of the plug includes a second drive socket recessed in the first end of the plug.

10. The wire harness retainer assembly of claim 1, wherein the first end of the stud is threaded.

11. The wire harness retainer assembly of claim 1, wherein the first end of the stud comprises a first material, and wherein the second end of the stud comprises a second material that is different than the first material.

12. The wire harness retainer assembly of claim 11, wherein the first material comprises a metal, and wherein the second material comprises a plastic.

13. The wire harness retainer assembly of claim 1, wherein the stud, the wire harness retainer, and the plug are configured to be permanently coupled to one another when the plug is positioned at least partially within the cavity of the stud.

14. A method of installing a wire harness retainer assembly, the method comprising:
positioning a first end of a stud into a hole in a structure, wherein the stud includes a second end opposite the first end, and wherein the stud includes a cavity between the first end and the second end, the stud including a plurality of biasing arms that define an opening at the second end of the stud, wherein positioning the first end of the stud into the hole comprises driving the first end of the stud into the hole via a drive socket recessed in a base between the first end of the stud and the second end of the stud;
positioning a wire harness retainer circumferentially around at least the second end of the stud; and
inserting a plug through the opening toward the first end into the cavity of the stud.

15. The method of claim 14, wherein the wire harness retainer interacts with the second end of the stud to prevent axial movement of the wire harness retainer with respect to the stud when the wire harness retainer is positioned circumferentially around the second end of the stud.

16. The method of claim 14, wherein the plug interacts with the second end of the stud to prevent axial movement of the plug with respect to the stud when the plug is positioned in the cavity of the stud.

17. An aircraft comprising:
an aircraft structure; and
a wire harness retainer assembly configured to be coupled to the aircraft structure, the wire harness retainer assembly comprising:
a stud including a first end and a second end opposite the first end, wherein the first end of the stud is configured to be positioned within a hole formed in the aircraft structure, wherein the stud includes a cavity between the first end and the second end, the stud comprising a plurality of biasing arms that define an opening at the second end of the stud, and wherein the stud is configured to receive a wire harness retainer thereon wherein the cavity includes a base between the first end of the stud and the second end of the stud, and wherein the base includes a first drive socket recessed in the base; and
a plug configured to be inserted through the opening toward the first end into the cavity of the stud to lock the wire harness retainer onto the stud.

18. The aircraft of claim 17, wherein the cavity is defined by an area between the plurality of biasing arms.

19. The aircraft of claim 17, wherein the plug includes a plurality of protrusions, wherein the plurality of biasing arms each include a recess configured to interact with the plurality of protrusions to thereby prevent axial movement of the plug with respect to the stud when the plug is positioned at least partially in the cavity of the stud, wherein the plug includes a plurality of longitudinal channels, and wherein the plurality of biasing arms each include a spine configured to interact with the plurality of longitudinal channels to thereby prevent axial movement of the plug with respect to the stud when the plug is positioned at least partially in the cavity of the stud.

20. The aircraft of claim 17, wherein the plurality of biasing arms each comprise a first end coupled to the base, and wherein a second end of each of the plurality of biasing arms has an angled tab with a thickness greater than a thickness of the first end of each of the plurality of biasing arms.

* * * * *